United States Patent Office 2,890,220
Patented June 9, 1959

2,890,220
NEW DYESTUFF OF THE PERYLENE TETRACARBOXYLIC ACID SERIES

Wilhelm Eckert, Frankfurt am Main, and Hermann Remy, Bad Soden (Taunus), Germany, assignors to Farbwerke Hoechst Aktiengesellschaft vormals Meister Lucius & Brüning, Frankfurt am Main, Germany, a corporation of Germany No Drawing. Application October 15, 1957
Serial No. 690,203

Claims priority, application Germany October 24, 1956

1 Claim. (Cl. 260—281)

The present invention relates to a new valuable dyestuff of the perylene tetracarboxylic acid series, more particularly it relates to a dyestuff corresponding to the following formula:

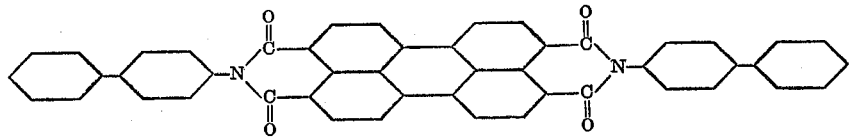

In our U.S. patent application Serial No. 661,261, filed on May 23, 1957, now abandoned, for "New Dyestuff of the Perylene Tetracarboxylic Acid Series" is described a process for the manufacture of a dyestuff which is especially advantageous for imparting to plastics, such as polyvinyl chloride containing a plasticizer, or polyethylene, or lacquers and printing inks, colorings which possess very good properties of fastness, which comprises condensing perylene-3,4,9,10-tetracarboxylic acid or its anhydride with para-cyclohexyl-aniline.

Now we have found that a dyestuff of similar excellent properties is obtained by reacting perylene-3,4,9,10-tetracarboxylic acid or its anhydride with 4-aminodiphenyl.

The new dyestuff is very suitable as a pigment in the printing ink and lacquer industries, for imparting fast colorings to plastics, such as polyvinyl chloride containing a plasticizer, or polyethylene, and also for coloring bakeable lacquers or for dyeing spinning solutions.

The following examples serve to illustrate the invention, but they are not intended to limit it thereto, the parts being by weight unless otherwise stated, and the relationship of parts by weight to parts by volume being the same as that of the kilogram to the liter:

Example 1

20 parts of perylene-3,4,9,10-tetracarboxylic dianhydride, 52 parts of 4-aminodiphenyl and 5 parts by volume of concentrated hydrochloric acid are introduced in succession into 400 parts by volume of quinoline, while stirring. The mixture is heated for 14 hours at 210° C., while continuously distilling off the water. The product is then filtered off with suction in the cold, washed several times with methanol, boiled with dilute sodium hydroxide solution, washed with hot water until neutral, and dried.

The red dyestuff so obtained does not melt at or below 300° C., is sparingly soluble in the customary organic solvents and dissolves in concentrated sulfuric acid to give a violet solution exhibiting no fluorescence. It is distinguished by its extraordinary clarity and excellent properties of fastness, both in lacquers and in polyvinyl chloride compositions, and possesses a very good fastness to oil, over-spraying, solvents, bleeding, and light.

Example 2

In an autoclave provided with a stirrer, 20 parts of perylene-3,4,9,10-tetracarboxylic dianhydride, 52 parts of 4-aminodiphenyl and 3 parts of concentrated sulfuric acid are introduced in succession into 320 parts of water. The mixture is stirred for 12 hours at 200–210° C. The product is then filtered off with suction in the cold and worked up as described in Example 1. The dyestuff so obtained is identical with the product described in Example 1.

We claim:
The dyestuff corresponding to the following formula:

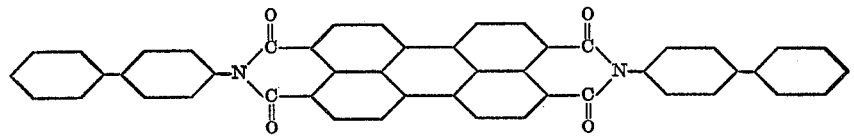

References Cited in the file of this patent
UNITED STATES PATENTS

| | | |
|---|---|---|
| 1,715,430 | Schmidt et al. | June 4, 1929 |
| 2,543,747 | Shrader | Mar. 6, 1951 |